United States Patent [19]

Bazzaz

[11] Patent Number: 5,555,033
[45] Date of Patent: Sep. 10, 1996

[54] METHOD AND DEVICE FOR ESTIMATING MOTION OF OBJECTS IN SUCCESSIVE ANIMATED IMAGES SUBDIVIDED INTO TOW-DIMENSIONAL BLOCKS OF PIXELS

[75] Inventor: Paul Bazzaz, Paris, France

[73] Assignee: U.S. Philips Corporation, New York, N.Y.

[21] Appl. No.: 582,234

[22] Filed: Jan. 3, 1996

Related U.S. Application Data

[63] Continuation of Ser. No. 223,623, Apr. 6, 1994, abandoned.

[30] Foreign Application Priority Data

Apr. 7, 1993 [FR] France ................................. 93 04138

[51] Int. Cl.$^6$ ................................................. H04N 7/28
[52] U.S. Cl. ............................................ 348/699; 348/420
[58] Field of Search .................................. 348/699, 420, 348/402, 413, 416

[56] References Cited

U.S. PATENT DOCUMENTS 4,992,870 2/1991 Samad ................................ 348/700

FOREIGN PATENT DOCUMENTS

2628864 3/1988 France ............................ G06F 15/70
2214751 9/1989 United Kingdom .

Primary Examiner—Tommy P. Chin
Assistant Examiner—A. Au
Attorney, Agent, or Firm—Edward W. Goodman

[57] ABSTRACT

Method of estimating motion of objects, applied to two-dimensional blocks which are successively scanned in an image, including the steps of determining a set of error data and a motion vector for each current block, and of creating "regions" formed from one block or from several adjacent blocks each having a single motion vector. This method is performed by a device which includes a coherence structure with: memory modules (M1, M4, M5) for storing the sets of error data of the current block, of the regions already formed and their respective numbers, respectively; working modules (R2 and R3) constituted by two fixed delays to be applied to the sets of error data of the left and upper regions which are candidates for attachment to the current block; computation modules (11, 12) for comparing the sets of error data of the current block and those of said candidate regions and for possibly deciding the attachment as a function of predetermined criteria; multiplexers (MUX1, MUX2, MUX3) for switching the data between the different modules, and a module (10) for controlling the operations of switching and computation.

8 Claims, 4 Drawing Sheets

METHOD AND DEVICE FOR ESTIMATING MOTION OF OBJECTS IN SUCCESSIVE ANIMATED IMAGES SUBDIVIDED INTO TOW-DIMENSIONAL BLOCKS OF PIXELS

This is a continuation of application Ser. No. 08/223,623, filed Apr. 6, 1994, now abandoned.

BACKGROUND OF THE INVENTION

1. Field of the Invention

The invention relates to a method of estimating motion of objects in successive animated images subdivided into two-dimensional blocks scanned in accordance with a predetermined sequence in each image, said method comprising the steps of determining a set of error data and, based on this set, estimating a motion vector for each current block of one of the successive images with respect to blocks of the preceding image within a search window.

The invention also relates to a device for performing this method.

A motion vector is to be understood to mean a vector characterizing the shift of the current block with respect to a block of the preceding image in the sequence and having the closest luminosity properties of the current block.

The invention is used in the field of television, in image coding systems and for various television standards, for example, for conventional television, high-definition television, or for the American or European system, etc.

2. Description of the Related Art

A motion estimation device is already known from Patent Specification GB 2,214,751. This Specification describes a method referred to as "Block Matching Process" or motion estimation method by correspondence of blocks. In this method, denoted BMA (Block Matching Algorithm) hereinafter, a search of a corresponding block is effected in the image which precedes the current image and in a neighborhood of given dimensions marked by a window referred to as the search window, which dimensions are related to a maximum amplitude of the searched motion vector. The corresponding block is the block which, in accordance with predetermined criteria, has the luminosity properties which are most similar to those of the current block.

The drawback of the known BMA process is that it provides non-coherent motion vectors. Non-coherence is to be understood to mean that in the image, which is decomposed into blocks, the probability that neighboring blocks have either the same motion vector or a vector of close value is very small. The result is that the effects of subdivision into blocks appear during reconstitution of the image on the basis of these non-coherent motion vectors, which effects consist of discontinuities at the borders of blocks which do not have identical motion vectors.

SUMMARY OF THE INVENTION

It is an object of the invention to minimize the effects of block subdivision.

If the current image is subdivided into X×Y blocks in accordance with the horizontal and vertical directions, the BMA process may provide X×Y different motion vectors in the worst case.

For application in the field of image compression for high-definition television or digital television, etc., it is indispensable to reduce, at the source, the volume of data to be transmitted or to be stored.

It is another object of the invention to minimize the number of motion vectors found in each image by optimizing each of these vectors so as to further reduce the number of information components to be transmitted, leading to a reconstitution of an image of better quality.

Thus, an object of the invention is to provide a device with which a method can be carried out which is capable of making spatially coherent the groups of motion vectors previously computed by means of a known BMA device.

A further object of the invention is to provide such a device using a minimum of hardware, i.e., principally a number of memories which is as small as possible, and memories having a size or capacity which is as small as possible.

The device according to the invention has numerous advantages, inter alia:

the number of data to be transmitted is reduced, which is particularly interesting in the field of television coding, the effects of the subdivision into blocks are minimized in the reconstructed image, which is thus improved.

The objects of the invention are achieved and the advantages are obtained by a method as described in the opening paragraph, which is characterized in that, based on sets of error data relating to individual blocks, the method comprises the steps of creating "regions" constituted by a block or by a plurality of adjacent blocks in the image, and of progressively growing these regions by attaching the current block to an adjacent region comprising blocks which have already been scanned, so as to ensure the growth of homogeneous regions each having the same motion vector.

In a special embodiment, this method is characterized in that the creation and growth of said regions comprises the steps of:

a) storing sets of error data relating to the current block, to the regions already formed, and storing numbers assigned to these respective blocks and regions;

b) applying two fixed delays to the sets of error data of the regions which are adjacent to the current block and have already been treated, which regions are referred to as potential regions and are candidates for forming a new region by attachment to the current block;

c) comparing sets of error data of the current block with those of said potential regions, and deciding, as a function of predetermined criteria, on either attaching the current block to one of said potential regions or on initializing a new region on the basis of this current block;

d) multiplexing between the sets of error data relating to the current block and to the already treated regions which have been stored and delayed, and the sets of error data relating to the current block and to the potential regions which are to be compared and stored;

e) controlling the procedure of comparing, multiplexing and storing the data.

A device for performing this method comprises a module (BMA) which determines a set of error data and, based on this set, a motion vector for each current block of one of the successive images with respect to blocks of the preceding image within a search window, and is characterized in that the device also comprises a coherence structure for creating said regions in the image, theses regions being constituted by a block or by a plurality of adjacent blocks, and for progressively growing these regions by attaching a current block to an adjacent region comprising blocks which have already been scanned and have the same motion vector.

In a special embodiment of this device, the coherence structure comprises:

a) memories for storing the sets of error data of the current block, of the regions already formed, and the numbers assigned to these blocks and regions, respectively;

b) working modules constituted by two fixed delays to be applied to the sets of error data of the already treated regions which are adjacent to the current block and are referred to as potential regions which are candidates for forming a new region by attachment to the current block;

c) computation modules for comparing the sets of error data of the current block with those of said potential regions and for deciding, as a function of predetermined criteria, on either the attachment of the current block to one of said potential regions or on the initialization of a new region on the basis of this current block;

d) multiplexers for searching the error data in one of the memory modules or working modules and for directing them to the computation modules and the memory for storing the data of the regions, respectively;

e) a module for controlling the procedure of the computation and the multiplexer modules, and for addressing the memories.

These and other aspects of the invention will be apparent from and elucidated with reference to the embodiments described hereinafter.

DESCRIPTION OF THE PREFERRED EMBODIMENT

The invention is described in a concrete but non-limitative example applied for high-definition television.

A high-definition television signal is currently to be understood to mean a signal for displaying 1250 lines with 1728 pixels per line on a display screen in accordance with an interlaced system.

An interlaced system is to be understood to mean that each frame of 1250 lines is composed of two fields each comprising half the number of 1250 lines. Among these two fields, one is referred to as the EVEN field and comprises all the even lines of the frame and the other is referred to as the ODD field and comprises all the odd lines of the frame. These two fields or sub-assembly of lines are superimposable.

The television image is displayed on a screen by means of a temporal scanning which, at an initial instant, starts at the top and at the left of the screen and proceeds by displaying the first line of the first field towards the right, and then each successive line from top to bottom until the whole first field has been displayed. An identical temporal scanning subsequently displays all the lines of the second field.

Such a high-definition video signal comprises 4 times the number of information components as compared with a normal definition video signal. Thus, there will be a problem in the transmission of high-definition images through normal definition television signals.

Thus the number of information components to be transmitted is to be reduced by detecting the existence of motion in an image with respect to another image. For example, the signal may be sub-sampled by a factor of 2 by eliminating the EVEN fields. The object of the motion estimator is to compute the motion vectors of each EVEN field, the latter not being transmitted, as a function of the preceding or following ODD field, or as a function of both. These motion vectors will be transmitted to a decoding system which is capable of reconstructing the missing field by using the motion vectors and the ODD fields by means of interpolation of motion compensation.

The object of the present invention is to provide a motion estimation method providing, for each field, a number of motion vectors which is reduced as much as possible and a device to carry out this method with an economy of technical means, notably an economy in the number of memories and memory capacities.

For the purpose of simplicity of expressions and generalization of concepts, the following description will refer to "image" processing, rather than to "field" processing.

Figure 1:
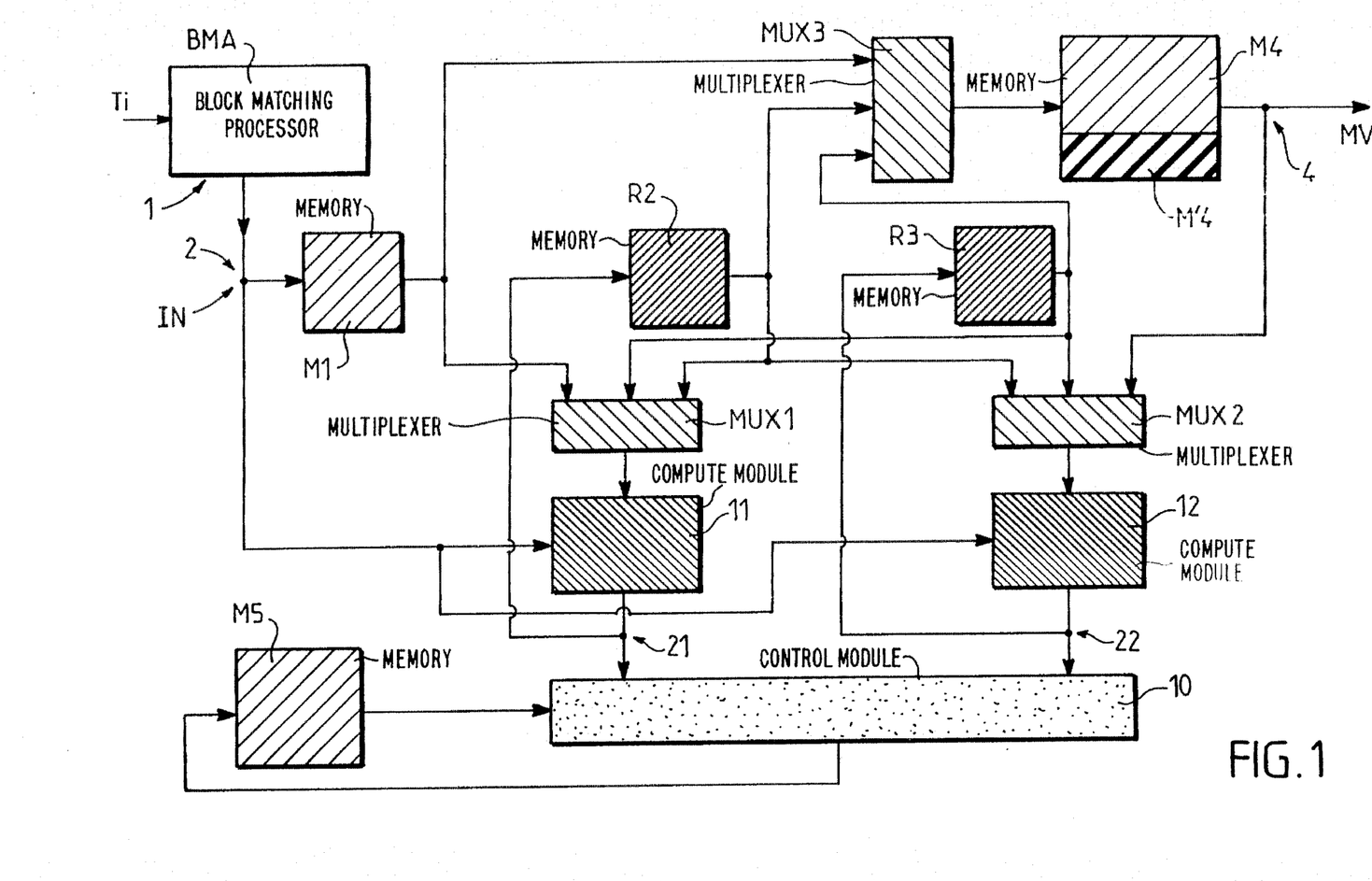
FIG. 1 shows the structure of the coherence device composed of functional modules.

With reference to FIG. 1, the device to carry out the method according to the invention is shown in the form of a structure composed of functional modules comprising a first module 1 which is capable of furnishing the motion vectors associated with a certain number of two-dimensional blocks which are subdivisions of the image Ti to be treated. This module 1 is in conformity with the system known in the state of the art, in which the BMA method is used. This module 1 will hereinafter be systematically referred to as "BMA module" for reasons of simplicity.

Figure 3:
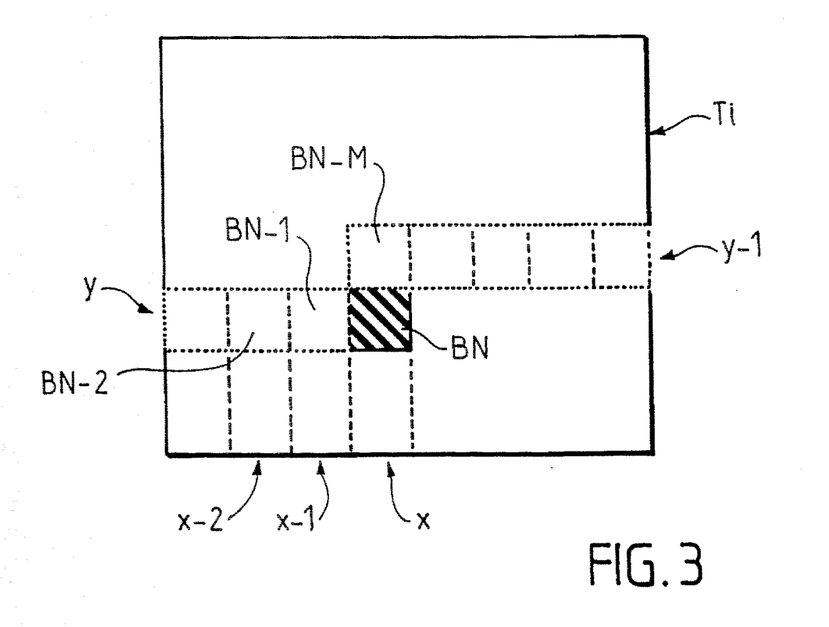
FIG. 3 shows the neighboring image blocks of a current block.

With reference to FIG. 3, the image Ti to be treated in the BMA module 1 is subdivided into X×Y blocks arranged in rows and columns, respectively, and a motion vector is searched for each of these blocks. The blocks are treated in accordance with the conventional television scanning method currently used, i.e., from top left to bottom right.

Thus, the current block BN is situated in the yth row, starting from the top of the image Ti and in the xth column, starting from the left. Because of this conventional scanning, all the blocks situated in the upper row y-1 and all the blocks situated in the left-hand columns of the same row y have already been treated at the moment when the current block BN is being treated. The block BN is the Nth block treated since the start of the treatment of the image Ti, which treatment has taken place at the top and at the left of this image Ti. The block BN thus has the number N in the chain of treatment of the image Ti.

Figure 2:
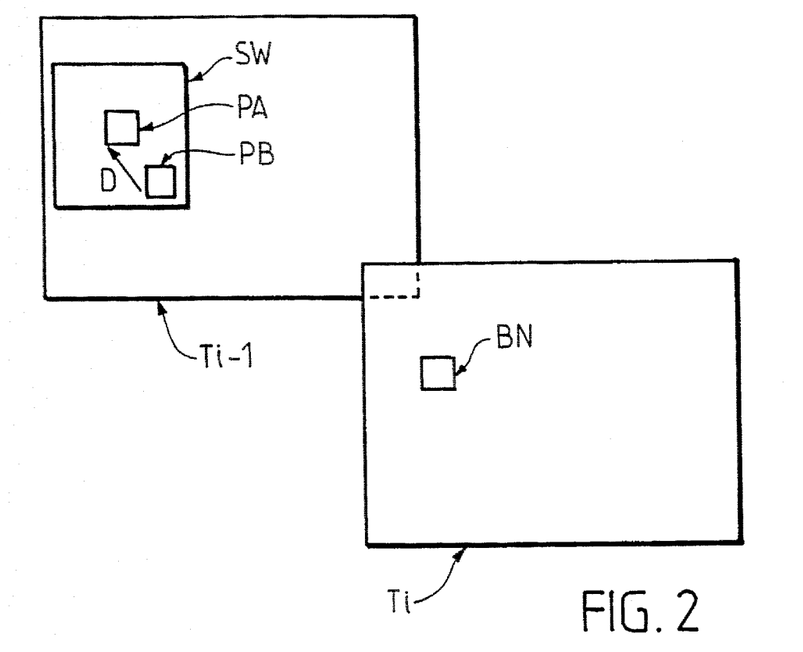
FIG. 2 illustrates the determination of a motion vector with respect to an image block by means of the BMA module of the structure shown in FIG. 1.

With reference to FIG. 2, the BMA module provides the possibility for each current block BN of the image Ti scanned in the conventional manner, to search in the preceding image Ti-1 and in a neighborhood of a given size, or search horizon marked by a search window SW, the block which, in accordance with a predetermined criterion, has the closest luminosity properties of the current block.

To this end an orthogonal projection PB, as shown in FIG. 2, of the current block BN of the image Ti is realized in the preceding field Ti-1. Subsequently, the previous position PA of the current block BN is searched in this preceding image Ti-1. The displacement or motion between the orthogonal projection PB and the previous position PA is materialized by means of said motion vector $\vec{D}$.

For effecting this search of the corresponding block situated at the previous position PA, the BMA module constitutes an assembly of data referred to as "set of error data". This set is constituted by the following three types of error data:

A/ an "error card" which assembles the values referred to as errors E(D) relating to the differences in luminosity of the pixels of the current block and the luminosity of the pixels of the blocks situated within the search window and being displaced opposite this current block, or its projection PB of a value D having dx and dy as its components.

Various criteria for defining the error E(D) are possible. A first criterion is based on the average of absolute values of the luminosity difference between the pixels of the current block and those of the search window block in the preceding image displaced by a vector D.

The intensity I of a pixel at the coordinates x, y in the current block BN is written as:

$$I(x,y).$$

The intensity I of a corresponding pixel situated in the search window block displaced by a vector D with respect to the orthogonal projection block PB of the current block BN in the preceding field Ti-1 is written as:

$$I(x-dx, y-dy).$$

The error based on the average of the absolute values is written as:

$$E(D) = \sum_X \sum_Y |I(x,y) - I(x - dx, y - dy)|$$

Another criterion for computing the error E(D) may be realized in accordance with the least squares method which is written as:

$$E(D) = \sum_X \sum_Y [I(x,y) - I(x - dx, y - dy)]^2$$

Said "error card" thus assembles the errors E(D) defined in accordance with one of the chosen criteria corresponding to all the possible displacements D in the search window chosen.

B/ a BMA error which is the minimal error among all the errors of the error card;

C/ a minimum vector which is the motion vector corresponding to said minimal or BMA error.

The BMA module chooses the estimated vector for the current block as the motion vector which corresponds to said minimal or BMA error, i.e., said minimum vector.

The device according to the invention is intended to apply a coherence process to each block treated by the BMA module, i.e., the device according to the invention has for its object to render the motion vectors computed by the BMA module coherent.

With reference to FIG. 1, the device according to the invention comprises a coherence system with which said "regions" in the current image Ti can be created on the basis of individual blocks, and in which these regions can be progressively made to grow by attaching the current block BN to an adjacent region comprising the blocks which have already been scanned, thus ensuring the growth of homogeneous regions having the same estimated motion vector.

To this end, the coherence system according to the invention comprises means for merging several neighboring blocks. This merging may take place until the reunion of all the blocks of a complete image in the case of a stationary image, which corresponds to zero motion vectors. The blocks thus merged form the entity which is referred to as "region" and which thus has a single motion vector.

Among the means for merging the blocks, the coherence system according to the invention comprises means for comparing the block BN to be estimated in a current image Ti with its neighborhood which has already been treated. If it is considered that the scanning method used is the conventional method currently used in television—from top left to bottom right—the neighborhood already treated is thus constituted by the left contiguous block BN-1 on the same row y of blocks and by the upper contiguous block BN-M in the same column x of blocks.

The comparison between the current block BN and the contiguous left and upper blocks is made on the basis of information supplied by the BMA module referenced 1 in FIG. 1, i.e., the set of error data:

A/ the error card,
B/ the minimal or BMA error,
C/ the minimum vector, which constitutes the assembly of "decision elements".

The growth of the regions by merging the current blocks should be initialized. An error card, a minimal error and a minimum vector specific of each region should be assigned to this region.

The first scanned block is thus assigned to a first region which is numbered 1 and whose initial data are those of this first block:

a/ the error card E(D) is initially that of the first current block as supplied by the motion estimation circuit 1 or the BMA system;

b/ the minimal error $E_{min}$=min(E(D)) is in this case the minimal error (BMA error) in the error card of the first current block;

c/ the optimal motion vector D is the vector to which said minimal error corresponds, d/ for each treated block, the number of the region to which it has been assigned is preserved, here the number 1 for the first block thus considered.

For a region created from neighboring blocks merged by means of the coherence system a'/ the error card of the region is the arithmetical sum of the error card of each block contained in this region, b'/ the minimal error (BMA error) of the region is the arithmetical sum of the intrinsic minimal errors of each block, c'/ the minimum vector of the region is the vector minimizing the error of the new error card relating to this region.

During treatment of a given block, the coherence system thus has means for comparing the intrinsic information of the current block BN with the information of this block merged with the contiguous left region, and with the information of this block merged with the contiguous upper region.

As a function of the criteria to be described hereinafter, three situations resulting from these comparisons may be considered:

1) the first possible situation is a situation in which no merging is considered. In this case, a new region is initialized which has the intrinsic information components of the current block as the corresponding information components;

2) the second possible situation is the situation in which merging with the left region is considered. In this case, an update is effected for providing the information components relating to this new region by adding the error cards, by adding the minimal errors and by replacing the minimum vectors by a new minimum vector which minimizes the new error card;

3) the third possible situation is the situation in which merging with the upper region is considered. In this case, an update is effected similarly as in the case of merging with the left region, but in which the information components relating to the upper region are taken into account.

There are some problems in the realization of the coherence system performing these operations or algorithms.

α) the first problem is related to the complexity of required memory access. The memories must be addressed twice during a basic temporal period. During the block period, the memory must be accessed 2n times, n being the number of clock periods. One might therefore be tempted to multiply the memories by 2 so as to solve this memory access problem;

β) the second problem is related to the capacity of memories required for storing the information. The part of the system consuming the majority of memory capacity will be the part reserved for storing the error card information. For example, 256 errors have to be stored at 16 or 24 bits. And not only should the system store the error cards of the current blocks to be estimated but also the error cards of the left region, those of the upper region, as well as those of all the potential regions of the field. In the majority of cases, which may not be exclusive, the system should be able to store the information relating to X×Y different regions corresponding to the case where no merging has been effected.

γ) the third problem is related to collision between the information components of different origins and ending at the same point in the system. The latter problem is thus essentially a problem of managing the data stream.

The coherence system according to the invention provides means for solving these three principal technical problems. According to the invention, the method or algorithm described above is effected without parallelization in that the current blocks are treated successively by the same hardware system. This technique of treating the data will hereinafter be referred to as "pipeline" and is notably based on the problem described under α). In this implementation, the number of memories can be minimized by 2 and the capacity of the memories can be diminished by an important factor, for example 72 if one starts from an image subdivided into 72 rows of blocks, which solves the problem described under β). Finally, the third problem, described under γ) relating to the data management, is solved by a system of multiplexers which switch the information from one point to another in the coherence system as a function of the environment of the block to be treated and of the merging decision to be taken.

According to the invention, the following decision criteria are used to decide whether a current block is to be merged with a block of the left or upper regions, or to decide whether it is not to be merged.

I) A rust merging criterion may be to compare the minimal error of the new region formed in the case of merging, with the sum of the minimal error of the region before merging and the minimal error of the current block. In this criterion, a multiplicative threshold may be introduced.

I') Other merging criteria of the same type as the first may be considered for improving i.e., refining the coherence process. If the criterion I or possibly I' is verified for the two possible merging operations, i.e., for the left and upper regions, a supplementary criterion referred to as the arbitration criterion is applied.

II) The arbitration criterion consists of comparing the errors searched in the error card of the current block corresponding to the minimum vectors of the left and upper regions after merging.

These criteria are realized by means of the following categories of decision elements:

(1) for the current block BN as defined above under A, B, C:

its error card,
its minimal or BMA error,
its minimum vector.

(2) for each prior region AG or AS (left or upper region) as defined above under a', b', c' (or a, b, c):

its respective error card,
its BMA or minimal error,
its optimal motion vector, i.e., minimum vector.

(3) similarly, for each new region AN constituted by associating either the prior left region AG or the prior upper region AS with the current block BN as defined under a', b', c' (or under a, b, c):

its respective error card,
its minimal error Emin(AN),
its minimum vector.

These necessary decision elements, or sets of error dam, are stored in the various memories in the device.

The criteria I, I' or II are written in the form of a given relation of inequality so that they can control or limit the degradation of the quality of the subsequent restitution of motion. To this end, for taking a merging decision, for example, the minimal error (BMA) of the new region should remain less than or equal to the sum, augmented by a threshold which is generally adjustable, of the minimal error (BMA) of the current block BN and of the minimal error (BMA) of the prior region.

It should be noted that this example is not limitative and for choosing other types of inequalities, other criteria of controlling the characteristics of the new region with respect to those of the prior region considered and with respect to the current block may be fixed.

With reference to FIG. 1, the structure of the coherence system comprises two principal parts:

memories M1, R2, R3, M4, M5 and M'4;
computation modules 11, 12 and 10.

This structure comprises also the means for correctly routing the data. These means are constituted by multiplexers MUX1, MUX2, MUX3.

The first memory M1 stores the set of error data relating to the current block BN: i.e., the error card of the current block as well as the minimal (or BMA) error of this card and the associated motion vector.

The second memory R2 and the third memory R3 store the respective sets of data relating to the left region including the current block after computing the merging of the left region, and the set of error data relating to the upper region including the current block after computing the merging of the upper region, these sets of error data being the error card and the corresponding minimal (or BMA) error as well as the motion vector associated with said minimal error for each region. The region information thus provisionally stored in the memories R2 and R3 is also stored, this time for all the regions of the image, and progressively during scanning, in the fourth memory M4 which thus contains the data relating to all the regions of the current image. The numbers of these regions and the correspondence between the number of a block and the number of the region including this block are stored in the fifth memory M5. These operations of storing the information in memory M4 and memory M5 are performed after the operations of merging or initialization.

With reference to FIG. 1, the computation modules comprise a computation module 11 for merging the left region, a computation module 12 for merging the upper region and a process controller 10.

The three multiplexers MUX1, MUX2 and MUX3 control the correct routing of the data between the memories M1, R2, R3, M4 and the computation modules 11 and 12.

With reference to FIG. 4, the regions adjacent to the current block BN are shown, which regions may constitute potential regions for merging.

Figure 4A:
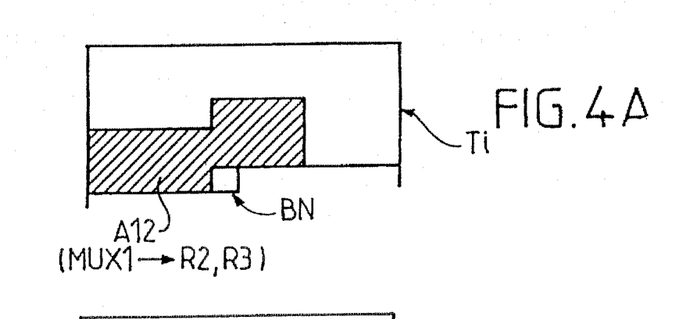
FIGS. 4A to 4C show the potential regions for merging, at the left, with a current block.
Figure 4B:
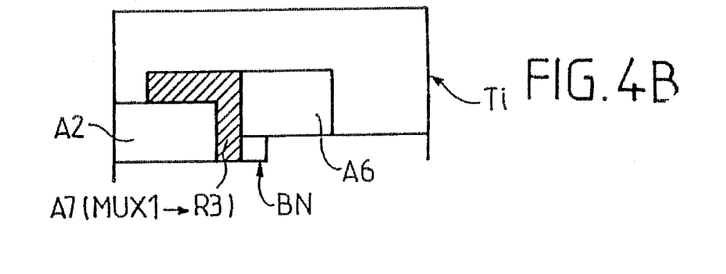
Figure 4C:
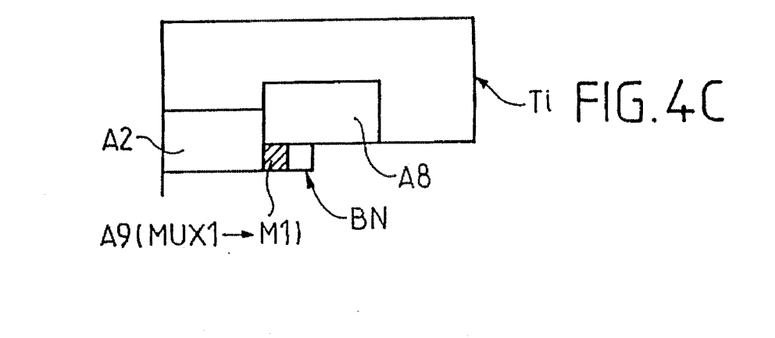

The adjacent potential left regions for the current block may be:

with reference to FIG. 4C, the preceding block A9 (in the case where said preceding block has initialized a new region): the set of corresponding error data is then available in the memory M1;

with reference to FIG. 4B, the preceding left region A7 (in the case where the preceding left region has merged with an upper region): this case is referred to as upper merging of the preceding block, the corresponding set of error data can be found in R3;

with reference to FIG. 4A, the preceding upper left region A12 (in the case of upper left merging of the preceding block): the corresponding set of error data can be found in the memory R3 or the memory R2.

The selection between the three memories M1, R2, R3 is realized by means of the multiplexer MUX1 as a function of the preceding decision and of the position of the current block.

Figure 4D:
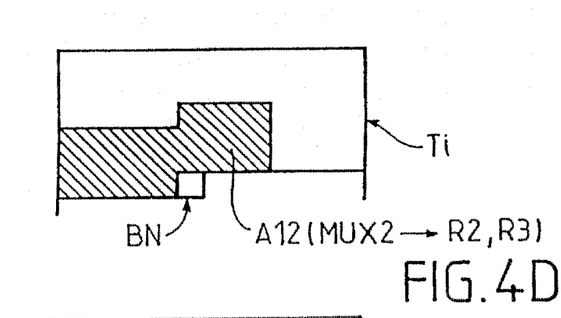
FIGS. 4D to 4F show the regions for merging, at the upper side.
Figure 4E:
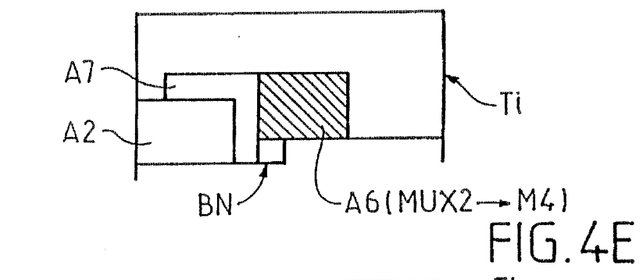
Figure 4F:
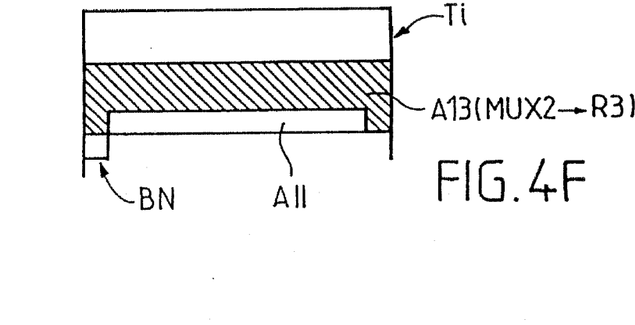

The adjacent potential upper regions for the current block may be:

with reference to FIG. 4D, the preceding left or upper region A12 (in the case of left or upper merging of the preceding block): the corresponding set of error data is available in the memory R2 or the memory R3;

with reference to FIG. 4F, the preceding upper region A13 (in the case of upper merging of the preceding block): the corresponding set of error data is available in the memory R3;

with reference to FIG. 4E, a region A6 which is not involved in a previous merging process: the corresponding set of data is available in the memory M4.

The selection between these three memories R2, R3, M4 is made by means of the multiplexer MUX2 as a function of the previous decision, the number of the regions involved in the process and the position of the current block. The address of the memory M4 depends on the number of the region to be read.

The created region, whose set of error data must be stored in the memory M4 after the decision of merging concerning the current block, may be:

the block already treated (in the case where it has initialized a new region): the set of error data will be stored in the memory M1;

the left region (in the case of left merging of the current block): the corresponding set of error data will be stored in the memory R2;

the upper region (in the case of upper merging of the current block): the corresponding set of error data will be stored in the memory R3.

The selection between these three memories is made by means of the multiplexer MUX3 as a function of the decision.

However, this can only be done after the computations and comparisons for the current block have been terminated, i.e., at the end of the sequence of the block.

For this reason, the storage of the set of error data of a region comprising the current block is realized in the time in which the next block is treated.

On the other hand, the address of the memory M4 depends on the number of regions to be stored.

The coherence procedure for the current block applied by the structure of FIG. 1 may be defined by the following steps:

STEP 1: the numbers of adjacent left and upper regions are read in M5;

STEP 2: the set of error data relating to the current block is stored in M1 and is simultaneously applied to the computation modules 11 and 12;

STEP 3: the set of error data relating to the adjacent left and upper regions is read in the appropriate memories M1, R2, R3 or M4 and simultaneously applied to the computation modules 11, 12;

STEP 4: the computations are effected by the modules 11 and 12;

STEP 5: the results are stored in the corresponding memory (R2 for computing the merging of the left region and R3 for computing the merging of the upper region), and the steps 2 to 5 are repeated until the end of the sequence of the current block;

STEP 6: a decision is taken on the basis of the computations;

STEP 7: a number of the region is stored for the current block in M5;

STEP 8: the error data relating to the block after merging (or to the initialized region) are read from memories M1, R2, R3 and stored in M4.

It is to be noted that the steps 3 and 8 are controlled by multiplexers MUX as a function of the position of the block, the adjacent regions and the merging decision.

Moreover, the number of the region of the block treated (the current block) may be the same as the number of the adjacent region in the case of merging, or it may be a new number (given by a region counter) in the case of initialization.

With these different elements now being available, it is decided to perform the merging with the left region or the merging with the upper region, or the initialization as a function of one of the criteria I, I' or II written in the form of a given relation of inequality, as already described.

The final attachment of the current block to a region (either to the adjacent left region or to the adjacent upper region, or to a new region initialized with this block itself) is thus realized by following the comparison steps as defined hereinbefore, which lead to four distinct situations:

(1) the merging of the current block with the prior left region is accepted (application of the inequality criterion I or I' to the left region) and the merging of this block with the prior upper region is refused (application of the inequality criterion I or I' to this upper region);

(2) the merging of the current block with the prior left region is refused and the merging of this block with the prior upper region is accepted (the criterion I or I' is verified for this prior upper region and is not verified for the prior left region);

(3) the merging of the current block with the one or the other of the prior left and upper regions is refused (the criterion I or possibly I' is not verified for any of these regions) and, with this block, there is an initialization of a new region;

(4) none of these two mergings is refused (application of criterion I or possibly I' which is verified) and, for choosing between the one and the other, the arbitration criterion II must be introduced.

This final attribution of the current block is realized by the computation units 11 and 12 which receive, from the first, second and third memories M1, R2, R3, the sets of error data related to the current block, to the prior left region and to the prior upper region, respectively, and determine, on the basis of all these information components, all the data which are obtained after possible merging of the block with one of these two prior regions, viz., the error cards of the new regions obtained in the one or the other case of merging as well as the minimal (BMA) errors and the minimum vectors associated with these possible new regions.

These new dam, associated with a new left region or with a new upper region will then be substituted, in the second and third working memories R2 and R3, for the sets of error data which related to the prior left and upper regions.

Having realized this first determination, the computation units 11 and 12 subsequently determine to which region the current block is effectively attributed (left region, upper region, new initialized region) and the data relating to the chosen region are copied again in the fourth memory M4 for storing the data of the region. Simultaneously with this storage in memory M4, the control unit 10 controls the operation of writing the number of the region previously associated with the current block in the fifth memory M5.

When the image has entirely been scanned block by block, the optimum motion vectors are retrieved for each block by consulting the fifth memory M5, which supplies the number of the region corresponding to this block, and the fourth memory M4 which supplies the estimated motion vector MV associated with the region assigned to this number, and subsequently these motion vectors are supplied by the computation units 11 and 12.

One of the advantages of the invention, consisting of a minimized number of memories and memory capacities has been accentuated hereinbefore. Up to now, the description has not dealt in detail with the way in which this advantage is obtained and in which the problems referred to under α), β) and γ) are solved. This will now be described.

With reference to FIG. 3, it appears that for a given block BN the number of neighboring regions is maximally X, this number X being the number of horizontal blocks, while Y is the number of vertical blocks. For example, Y may be 72.

In these circumstances, instead of having to store X times Y sets of error data relating to regions, —error card, minimal (BMA) error and minimum vector—, it is only necessary to store at most X sets. If Y is equal to 72, there will thus be 72 times fewer sets to be stored.

It is to be noted that the information for the error card is only useful to the extent where it relates to one or more potentially neighboring regions of the block to be estimated.

The reduction by Y—for example 72—of the capacity of the memory M4 relates to the errors, for example 256, which may constitute an error card in the case where the search window has a dimension of [−8, +7] pixels in the two horizontal and vertical directions. If the search window chosen has much larger dimensions, for example [−32, +31], the number of errors of the error card may become quite considerable, in this case 4096. These figures show how advantageous it is to have a system as disclosed in this invention and being capable of success by treating only X sets of error data instead of X×Y.

The structure of the system will now also be dealt with again so as to show how the problems are solved.

With reference to FIG. 1, the structure of the system comprises the three memories M1, R2, R3. The information of the current block is stored in MI. R2 receives the information of the new region constituted by the prior left region of the current block and this current block, i.e., the information of the new region constituted by a merging operation referred to as "left merging". The information of the new region constituted by a merging operation referred to as "upper merging" is stored in R3.

The existence of the memories R2 or R3 does not mean that a merging decision has been taken or has not been taken. This is why the memories M1, R2, R3 are referred to as "working memories".

In contrast, the memory M4 is the memory in which the sets of error data of the regions after merging are stored, thus the regions which are potentially adjacent to the blocks still to be estimated in the current field.

With reference to FIG. 1, it will be noted that the memory M4 is composed more specifically of a memory M'4 in which all the motion vectors computed for each region of the current image are stored. This memory M'4 makes it possible that no information relating to the motion vectors MV of all the regions of the image is lost. The motion vectors MV are available at the output at point 4 in the structure shown in FIG. 1.

In addition to the memories M1, R2, R3, M4 and M'4, the structure comprises the memory M5 in which the number of the region corresponding to a given block of the image is stored.

The computation modules 11 and 12 perform the following respective operations:

as regards computation module 11: the comparisons and computations for a possible left merging of the current block;

as regards the computation module 12: the comparisons and computations for a possible upper merging of the current block.

The structure comprises the module 10 which is a control module and controls the course of the process or algorithm. Its role comprises:

the merging decision;

the management of the numbers of the region and of the memory M5;

the management of the memories M1 and M4 as well as the management of the three multiplexers MUX1, MUX2, MUX3. With reference to FIG. 1, the first multiplexer MUX1 selects one of the three left regions of the current block BN. With reference to FIGS. 4A, 4B, 4C, this left region may originate from:

either the memory M1: for the potential left region A9 shown in FIG. 4C. Thus, MUX 1 selects M1;

or the memory R3: for the potential left region A7 shown in FIG. 4B. Thus, MUX1 selects R3;

or the memory R2: for the potential left region A12 shown in FIG. 4A. Thus, MUX1 selects R3.

The second multiplexer MUX2 selects one of the three potential upper regions of the current block BN. With reference to FIGS. 4D, 4E, 4F; this upper region may originate from:

either the memory R3: for the sole potential upper region A2. Thus, in the case corresponding to FIG. 4D, MUX2 selects R3 (or R2);

or the memory R3: for the potential upper region A13. Thus, in the case corresponding to FIG. 4F, MUX2 selects R3;

or the memory M4: for the potential upper region A6. Thus, in the case corresponding to FIG. 4E, MUX2 selects M4.

For a geometrical consideration, in the scanning direction of the blocks, it is found that a left region can never originate from memory M4, or more precisely, a region which has not been involved in the previous merging process, cannot in any case constitute a potential left region of the current block.

Similarly, a previous block initializing a region cannot in any case constitute a region which is higher than the current block.

Under these conditions, as shown in FIG. 1, there is no feedback between the memory M4 and the computation module 11, nor is there any feedback between the memory M1 and the computation module 12.

Finally, the multiplexer MUX3 selects, as a function of the merging decision, the information stored either in the memory M1 (when there is no merging, with initialization of a new region), or in the memory R2 (when there is left merging: with an update of the information relating to the modified regions), or in the memory R3 (in the case of upper merging, with an update of the information relating to the modified regions).

Figure 5A:
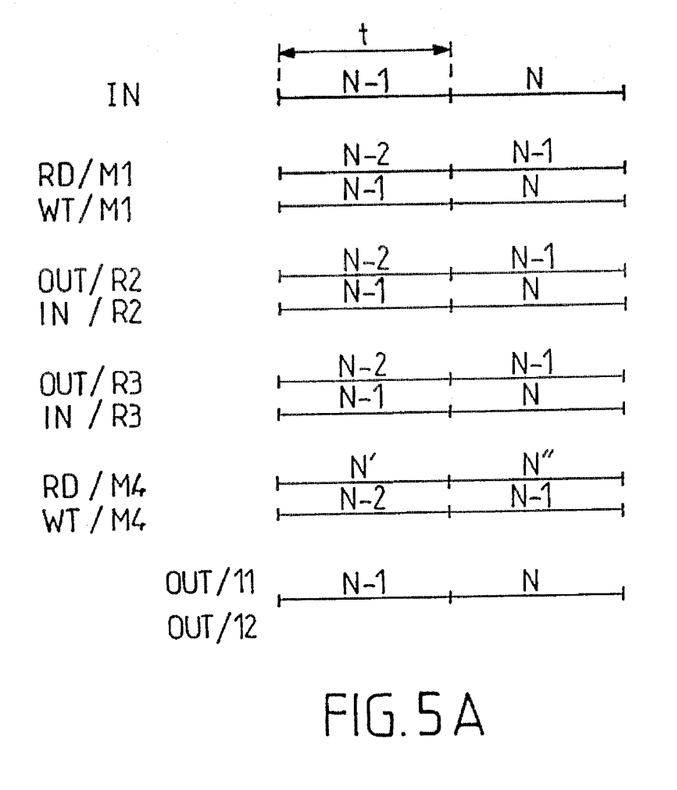
FIGS. 5A and 5B show the chronogram for the operation of the memory modules having the structure shown in FIG. 1.
Figure 5B:
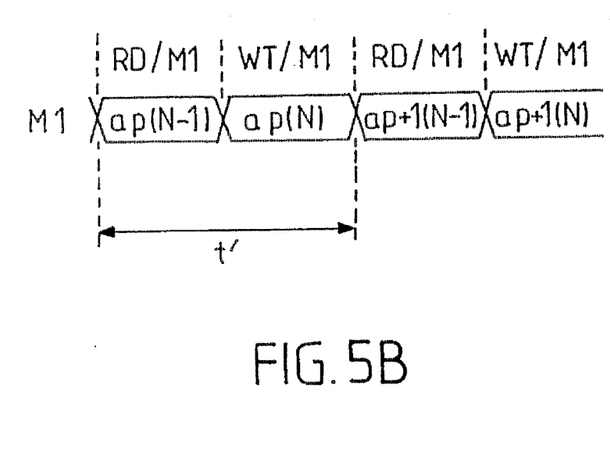

From a temporal point of view, the process is illustrated in FIGS. 5A and 5B. The reference IN represents the data supplied by the BMA module and entering the system of coherence at point 2 of the structure shown in FIG. 1 and referenced IN.

With reference to FIG. 5A, during the entire period t of treating the block BN to be estimated and numbered N in the image Ti, the information corresponding to the preceding block numbered N-1 in this image Ti (see FIG. 3) is read in the memories M1, R2, R3. Simultaneously, the new information concerning the block numbered N is written.

A reading phase is referenced RD in this FIG. 5A and a writing phase is referenced WT. For example, a reading phase in M1 is referenced RD/M1. A writing phase is referenced WT/M1. The same applies to the memory M4 where reading and writing are referenced RD/M4 and WT/M4, respectively. In contrast, the data inputs are referenced IN/R2 and IN/R3 in the working memories R2 and R3, respectively, while the data outputs are referenced OUT/R2 and OUT/R3, respectively. The outputs 21 and 22 of the modules 11 and 12 are referenced OUT/11 and OUT/12, respectively.

The computation modules 11 and 12 of the structure shown in FIG. 1 treat the information of this block of the row N before writing this information into the memories M1 and R2, or R3.

During this period t, the memory M4 is read for providing the sets of error data relating to an arbitrary region numbered N" which constitutes the potential upper region of the current block of number N. The information concerning the preceding block numbered N-1 is written in this memory M4. This can be done because the decision of merging relating to the block numbered N-1 is already known at the moment when the block numbered N is treated.

The chronogram of FIG. 5B illustrates the replacement of the prior value corresponding to a vector denoted Dp already stored at the address p and referenced ap in a memory, by the new value corresponding to the same vector but this time relating to the current block numbered N. In the course of a period t', which corresponds to the basic period t for a block divided by the number of pixels in the block, the address p for the block N-1 is first read, which is referenced ap(N-1) and then the address p for the block N is written, which is referenced ap(N). Subsequently, one proceeds to the vector denoted Dp+1 at the address ap+1, etc.

As described hereinbefore, the coherence structure according to the invention comprises two special memories, viz.:
the memory R2 for the left region;
the memory R3 for the upper region.

The problem of using the memories is generally based on the fact whether they are to be addressed in a correct manner. It is thus necessary to provide an addressing device for these two memories R2 and R3.

A particularly advantageous feature of the invention is that these memories are constituted by delays; i.e., the modules of the memories R2 and R3 are modules having a fixed delay; since the delays are chosen to be fixed, these modules of the memories R2 and R3 need not be controlled.

The modules of the memories R2 and R3 thus do not really store the data relating to the left and upper regions but are intended to temporarily delay the sets of successive error data relating to the left and upper regions.

Another particularly advantageous feature of the invention is that, for choosing the right path of data corresponding to the transfer of sets of error data during the computation relating to each current block, the structure comprises the three multiplexers MUX1, MUX2, MUX3 already described, each having three inputs and one output.

However, it is important to note that the memories M1 and M4 are genuine memories.

The difference between the memory M1, which may be a real memory, and the delays R2 and R3 is due to the fact that for the current block of row N, it should be possible to read the error corresponding to the minimum vector of the region after merging, and thus the error corresponding to the minimum vector of this current block in this region (this corresponds to the criterion of having to choose between an upper merging or a left merging in the case where the first criteria have been positive for the two types of merging). For example, in the case of a memory having 128 boxes, an error denoted E on a minimum vector denoted $V_i$ is stored in each box, i.e.,:

$EV_1, EV_2 \ldots EV_i$, etc., i ranging between 1 and 128.

The computation for merging gives a minimum vector denoted $V_{MIN}$ which will be either $V_1$ or $V_2 \ldots$ or $V_i$. This information $EV_{MIN}$ is necessary and the system must be able to search it at the right place. Thus, the position of the error associated with this vector should be known exactly.

This is the reason why the memory M1 cannot be replaced by a fixed delay.

Reverting to the temporal diagram of FIG. 5B, the set of error data of the block N-1 is stored during treatment of the block numbered N-1, simultaneously when in said memory M1 the set of error data of the preceding block N-2 is read.

As is shown in FIGS. 4A–4F, it is known that in the subdivision into regions the preceding block N-1 constitutes the left region of the current block N and is thus necessary for computation of the current block.

In the system according to the invention, it is necessary to read and write at the same time. The vector $V_{N-1}$ relating to the preceding block N-1 is read and, during the same period t of the block, the error relating to the current vector $V_N$ is written.

It may a priori be assumed that a twice larger memory capacity for M1 will be necessary for performing these simultaneous operations of reading and writing.

However, it should be considered that before writing the new value constituted by the error for the vector $V_N$ relating to the current block of the row N, the prior value for the vector $V_{N-1}$ relating to the preceding block of the row N-1 is read, in conformity with the chronogram shown in FIG. 5B.

Thus, the address p is read, subsequently the prior value is erased by writing the new value. Consequently, a twice smaller memory capacity as envisaged a priori for M1 is necessary.

The memory M4 comprises the sets of error data of all the regions found in the image. The sets stored are only those which relate to the regions which may serve for treating the blocks remaining to be estimated in the image. It is thus also possible to economize on the memory capacity for memory M4.

The invention may also be used in the case where the blocks are scanned arbitrarily in accordance with a predetermined sequence instead of being scanned from left to right and from top to bottom, as is the case in the method and the device described hereinbefore.

In this case, the device shown in the form of functional blocks in FIG. 1 should be modified.

These modifications are in respect of the input connections of the multiplexers MUX1, MUX2 and MUX3. These multiplexers should no longer have three inputs, as was the case hereinbefore, but four inputs which are connected to the outputs of the memory M1
the memory M2
the delay R2
the delay R3.

In the case of regular scanning, which is customary as described hereinbefore, or in another regular manner in accordance with rows and columns, those skilled in the art will be able to find simplifications which are not possible with arbitrary scanning.

In addition to the supplementary connections for the multiplexers in the case of arbitrary scanning, the memory M4 cannot be diminished because it must ensure that every region already formed in the image can serve as an "adjacent" region for the current block. This means that this memory M4 should comprise all the regions of the image in this case.

I claim:

1. A method of estimating motion of objects in a sequence of animated images, said method comprising the steps for processing a current image in the sequence, including:

subdividing said current image into two-dimensional blocks arranged in rows and columns, and estimating, for each block, a set of error data, and based on said set, a unique motion vector attributed to the corresponding block;

minimizing the number of motion vectors in the current image by creating and growing regions formed by merging adjacent blocks having coherent motion vectors, and by attributing to each created or grown region a unique motion vector which is coherent with the motion vectors of the merged blocks, including the sub-steps:

scanning the blocks of said current image, regularly, row after row and, in each considered row, column after column, in a manner that a current block has at most two previously scanned adjacent blocks referred to as potential blocks, respectively, localized in the same column and in the same row as said current block;

estimating, based on a comparison of the respective sets of error data of potential blocks and current blocks, a first criterion of coherence of motion vectors of potential blocks with respect to the current block, and a second criterion of arbitration between motion vectors of the potential blocks, for selecting, according to said first and second criteria, at most one of said potential blocks having a motion vector coherent with the motion vector of said current block;

creating a region by merging said current block and said selected potential block, and estimating for said region a set of error data and, based on said set, a unique motion vector for said region;

progressively growing said region, referred to as potential region when adjacent to subsequent current blocks, by merging said potential region with one subsequent current block at a time, every time the motion vector of said potential region is coherent with the motion vector of said subsequent current block according to said first and second criteria.

2. A method as claimed in claim 1, wherein the creation and growth of region comprises the steps:

(a) storing sets of error data relating to the current block, to the potential block, to the regions already formed, and storing numbers assigned to these respective blocks and regions;

(b) applying two fixed delays to the sets of error data of the potential regions or blocks relating to the current block which are candidates for creating and growing a region by merging with the current block;

(c) comparing sets of error data of the current block with those of said potential regions or blocks, and deciding, according to the first and second criteria, on either merging the current block with one of said potential regions or blocks, or on initializing a new region on the basis of this current block;

(d) multiplexing between the sets of error data relating to the current block and to the already processed regions which have been stored and delayed, and the sets of error data relating to the current block and to the potential regions or blocks which are to be compared and stored;

(e) controlling the procedure of comparing, multiplexing and storing the data;

(f) applying negative feedbacks between the comparison and decision results relating to the destination of the current block and the data to be delayed and relating to the new regions including the current block, so as to replace the preceding data to be delayed in view of processing said subsequent block.

3. A method as claimed in claim 2, wherein the estimation of the motion vector of each block comprises the determination of:

an error card which assembles the errors relating to differences in luminosity of the pixels of the block in the current image, and the luminosity of the pixels of a predetermined zone, in the preceding image of the sequence, which is displaced with respect to the projection of said block in the preceding image in accordance with a motion vector, a minimal error which is the minimal error among all the errors of the error card, a minimum vector which is the motion vector corresponding to the minimal error, attributed as unique motion vector to said block, and wherein, for each new region by merging a potential region or block with said current block, the error card of the grown region is the arithmetical sum of the error cards of the blocks contained in said grown region, the minimal error relating to said grown region is the minimal error of the error card of said grown region, and the minimum vector corresponding to the minimal error relating to said grown region is the motion vector attributed as a unique motion vector for said grown region.

4. A method as claimed in claim 3, wherein wherein wherein said first and second criteria comprise:

I/ the first criterion comprising a comparison of the sum of the minimal errors relating to the current block and, respectively, each of said potential regions or blocks before merging, with, respectively, the minimal error relating to each of the two possibly grown regions which would be formed by merging said current block with, respectively, each of said two potential regions or blocks, said first criterion being written in the form of an inequality which is fulfilled if the minimal error relating to the possible grown region is less than or equal to the sum increased wit ha controllable threshold of the minimal error relating to the current block and of the minimal error relating to said potential region or block, and II/ the second criterion comprising a comparison of the minimal errors relating to the two possible grown regions which would be formed by merging the current block, and, respectively, each of said two potential regions or blocks, said second criterion being written in the form of an inequality which is fulfilled if the minimal error relating to one of said possible grown regions is less than the minimal error relation to the other of said possible grown regions, wherein, if said first criterion is fulfilled for two potential blocks or regions, the second criterion is undertaken, and wherein a decision of is taken if both the first and second criteria are fulfilled.

5. A device for estimating motion of objects in a sequence of animated images, for performing the method according to claim 1, having computation modules for processing a current image in the sequence, including:

a first computation module for subdividing said current image into two-dimensional blocks arranged in rows and columns, and for estimating, for each block, a set of error data, and based on said set, a unique motion vector attributed to the corresponding block; and a second computation module for minimizing the number of motion vectors generated by the first computation module in the current image by creating and growing regions formed by merging adjacent blocks having coherent motion vectors and by attributing to each created or grown region a unique motion vector which is coherent with the motion vectors of the merged blocks, said second computation module including:

means for scanning the blocks of said current image, regularly, row after row and, in each considered row, column after column, in a manner that a current block has at most two previously scanned adjacent blocks referred to as potential blocks, respectively, localized in the same column and in the same row as said current block;

means for estimating, based on the respective sets of error data of potential blocks and the current block, a first criterion of motion vectors of potential blocks with respect to the current block, and a second criterion of arbitration between motion vectors of the potential blocks, for selecting, according said first and second criteria, at most one of said potential blocks having a motion vector coherent with the motion vector of said current block;

means for creating a region by merging said current block and said selected potential block, and estimating, for said region, a set of error data and, based on said set, a unique motion vector for said region; and means for progressively growing said region, referred to as potential region, when adjacent to subsequent current blocks, by merging said potential region with one subsequent current block at a time, every time the motion vector of said potential region is coherent with the motion vector of said subsequent current block according to said first and second criteria.

6. A device as claimed in claim 5, wherein said second computation module comprises:

(a) memories for storing the sets of error data of the current block, of the potential blocks, and of the regions already formed, and numbers assigned to these blocks and regions, respectively;

(b) working structures constituted by two fixed delays to be applied to the sets of error data of the potential regions or blocks relating to the current block, which are candidates for creating or growing a region by merging with the current block;

(c) computation structures for comparing the sets of error data of the current block with those of said potential regions or blocks, and for deciding, according to the first and second criteria, on either merging the current block with one of said potential regions or blocks, or on initializing a new region on the basis of this current block;

(d) multiplexers having four inputs and one output for searching the error data in one of the memories or working structures, and for directing them to the computation structures and to the memory for storing the data of the regions, respectively;

(e) a structure for controlling the procedure of the computation modules, those of the multiplexers, and the addressing of the memories; and (f) negative feedback means coupled between the outputs of the computation structures and the inputs of the working structures relating to the sets of error data of the new regions including the current block and forming respective potential blocks and regions for the block subsequent to the current block, as to replace the preceding data in the working structures with a view to process said subsequent block.

7. A device as claimed in claim 5, wherein the computations of estimating a unique motion vector for each block by the first computation module which determines the set of error data, comprises the determination of:

an error card which assembles the errors relating to differences in luminosity of the pixels of said block in the current image, and the luminosity of the pixels of a predetermined zone in the preceding image of the sequence, which is displaced with respect to the projection of said block in the preceding image in accordance with a motion vector;

a minimal error, which is the minimal error among all the errors of said error card;

a minimum vector which is the motion vector corresponding to said minimal error attributed as unique motion vector to said block;

and wherein, for each region created or grown by merging a potential block or region with said current block, the computation structures determine:

the error card of the created or grown region as the arithmetical sum of the error cards of the blocks contained in said created or grown region;

the minimal error relating to said created or grown region as the minimal error of the error card of said created or grown region; and the minimum vector corresponding to said minimal error relating to said created or grown region as the motion vector attributed as unique motion vector for said created or grown region.

8. A device as claimed in claim 7, wherein the computation structures compare the error data of the current block and of the potential regions or blocks in accordance with the first criterion of coherence:

I) the minimal error, relating to a possible created or grown region which would be formed by merging said current block with, respectively, each of the two potential regions or blocks, is less than or equal to the sum increased with a controllable threshold of the minimal error relating to the current block and of the minimal error relating to said potential region or block, and possibly, if the first criterion I) is fulfilled for both said potential blocks or regions, in accordance with the second criterion of arbitration:

II) the minimal error, relating to one of said two possible created or grown regions, which would be formed by merging the current block and, respectively, each of the two potential regions or blocks, is less than the minimal error relating to the other of said two possibly created or grown regions, and wherein the computation structures take a positive decision of merging the current block with one of the potential regions or blocks if the first criterion is fulfilled for at least one potential block or region, and, if the first criterion is fulfilled for both potential regions or blocks at a time, the computation modules take the positive decision of merging with only one of said potential regions or blocks on the basis of the second criterion of arbitration.

* * * * *